(12) United States Patent
Shimada

(10) Patent No.: US 11,749,806 B2
(45) Date of Patent: Sep. 5, 2023

(54) POSITIVE ELECTRODE FOR NONAQUEOUS ELECTROLYTE SECONDARY BATTERY AND NONAQUEOUS ELECTROLYTE SECONDARY BATTERY

(71) Applicant: Panasonic Intellectual Property Management Co., Ltd., Osaka (JP)

(72) Inventor: Toshiki Shimada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 171 days.

(21) Appl. No.: 16/638,385

(22) PCT Filed: Jan. 10, 2019

(86) PCT No.: PCT/JP2019/000475
§ 371 (c)(1),
(2) Date: Feb. 11, 2020

(87) PCT Pub. No.: WO2019/146413
PCT Pub. Date: Aug. 1, 2019

(65) Prior Publication Data
US 2020/0365908 A1  Nov. 19, 2020

(30) Foreign Application Priority Data
Jan. 23, 2018 (JP) .................. 2018-009036

(51) Int. Cl.
*H01M 4/66* (2006.01)
*H01M 4/133* (2010.01)
(Continued)

(52) U.S. Cl.
CPC ............. *H01M 4/666* (2013.01); *H01M 4/13* (2013.01); *H01M 4/133* (2013.01); *H01M 4/505* (2013.01);
(Continued)

(58) Field of Classification Search
CPC ...... H01M 4/666; H01M 4/133; H01M 4/505; H01M 4/525; H01M 10/0525; H01M 2004/028
See application file for complete search history.

(56) References Cited

U.S. PATENT DOCUMENTS 6,365,299 B1   4/2002  Miyaki et al.
10,593,936 B2*  3/2020  Endo ..................... H01M 4/131
(Continued)

FOREIGN PATENT DOCUMENTS

CN    106232731 A    12/2016
EP    2903063 A1    8/2015
(Continued)

OTHER PUBLICATIONS

Extended (Supplementary) European Search Report dated Feb. 17, 2021 issued in counterpart European Patent Application No. 19743729.6.
(Continued)

*Primary Examiner* — Matthew J Merkling
(74) *Attorney, Agent, or Firm* — WHDA, LLP

(57) ABSTRACT

A positive electrode as an example of an embodiment includes a positive electrode current collector, a positive electrode mixture layer which is disposed on at least one surface side of the positive electrode current collector, and an intermediate layer which is interposed between the positive electrode current collector and the positive electrode mixture layer. The intermediate layer contains insulating inorganic particles having a thermal conductivity of less than 50 W/mK, highly thermal conductive particles having a thermal conductivity of 50 W/mK or more, a thermoplastic resin, and polyvinylidene fluoride. The content of the inorganic particles is 50% by mass or more relative to the mass of the intermediate layer.

4 Claims, 2 Drawing Sheets

(51) Int. Cl.
    *H01M 4/505*           (2010.01)
    *H01M 4/525*           (2010.01)
    *H01M 10/0525*        (2010.01)
    *H01M 4/13*             (2010.01)
    *H01M 4/02*             (2006.01)

(52) U.S. Cl.
    CPC ........... *H01M 4/525* (2013.01); *H01M 4/667* (2013.01); *H01M 10/0525* (2013.01); *H01M 2004/028* (2013.01)

(56) References Cited

U.S. PATENT DOCUMENTS

| | | | |
|---|---|---|---|
| 2013/0323589 A1* | 12/2013 | Yamaguchi | H01B 1/023 428/464 |
| 2016/0093922 A1 | 3/2016 | Endo et al. | |
| 2016/0190566 A1 | 6/2016 | Shiozaki et al. | |
| 2016/0254545 A1 | 9/2016 | Sugita et al. | |
| 2016/0285073 A1 | 9/2016 | Fujita et al. | |
| 2017/0081579 A1 | 3/2017 | Fujikawa et al. | |
| 2017/0279113 A1* | 9/2017 | Ohsawa | H01M 50/461 |
| 2019/0088951 A1* | 3/2019 | Han | H01M 4/668 |

FOREIGN PATENT DOCUMENTS

| | | |
|---|---|---|
| JP | 2012-142297 A | 7/2012 |
| JP | 2016-72221 A | 5/2016 |
| JP | 2016-127000 A | 7/2016 |
| JP | 2016-164868 A | 9/2016 |
| JP | 2016-186933 A | 10/2016 |

OTHER PUBLICATIONS

International Search Report dated Mar. 26, 2019, issued in counterpart Application No. PCT/JP2019/000475 (1 page).

English Translation of Chinese Search Report dated Mar. 29, 2023 for the related Chinese Patent Application No. 201980003807.1. (2 pages).

* cited by examiner

POSITIVE ELECTRODE FOR NONAQUEOUS ELECTROLYTE SECONDARY BATTERY AND NONAQUEOUS ELECTROLYTE SECONDARY BATTERY

TECHNICAL FIELD

The present disclosure relates to a positive electrode for a nonaqueous electrolyte secondary battery and a nonaqueous electrolyte secondary battery.

BACKGROUND ART

A positive electrode for a nonaqueous electrolyte secondary battery in which an intermediate layer containing inorganic particles is disposed between a current collector and a mixture layer has been known. For example, PTL 1 discloses a positive electrode which includes an intermediate layer having a thickness of 1 to 5 μm and containing inorganic particles having a lower oxidizing power than a lithium metal composite oxide serving as a positive electrode active material, and a conductive material. PTL 1 describes that heat generation due to a redox reaction between the positive electrode active material and an aluminum current collector can be suppressed while maintaining a good current collecting property.

CITATION LIST

Patent Literature

PTL 1: Japanese Published unexamined Patent Application No. 2016-127000

SUMMARY OF INVENTION

In a nonaqueous electrolyte secondary battery, such as a lithium-ion battery, it is an important task to suppress heat generation at the time of occurrence of abnormalities, such as internal short circuit. Although it is expected that the technique of PTL 1 will have the effect described above, there is a room for improvement regarding suppression of heat generation at the time of occurrence of abnormalities, such as internal short circuit.

A positive electrode for a nonaqueous electrolyte secondary battery according to an aspect of the present disclosure includes a positive electrode current collector, a positive electrode mixture layer which is disposed on at least one surface side of the positive electrode current collector, and an intermediate layer which is interposed between the positive electrode current collector and the positive electrode mixture layer, characterized in that the intermediate layer contains insulating inorganic particles having a thermal conductivity of less than 50 W/mK, highly thermal conductive particles having a thermal conductivity of 50 w/mK or more, a thermoplastic resin, and polyvinylidene fluoride, and that the content of the inorganic particles is 50% by mass or more relative to the mass of the intermediate layer.

A nonaqueous electrolyte secondary battery according to an aspect of the present disclosure is characterized by including the positive electrode, a negative electrode, and a nonaqueous electrolyte.

In the positive electrode for a nonaqueous electrolyte secondary battery according to the aspect of the present disclosure, it is possible to suppress heat generation at the time of occurrence of battery abnormalities.

DESCRIPTION OF EMBODIMENTS

A positive electrode for a nonaqueous electrolyte secondary battery according to an aspect of the present disclosure includes, as described above, an intermediate layer containing insulating inorganic particles having a thermal conductivity of less than 50 W/mK, highly thermal conductive particles having a thermal conductivity of 50 W/mK or more, a thermoplastic resin, and polyvinylidene fluoride. The insulating inorganic particles and polyvinylidene fluoride ensure the strength of the intermediate layer and ensure the adhesion of the intermediate layer to a mixture layer and a current collector. Furthermore, by using the highly thermal conductive particles having a thermal conductivity of 50 W/mK or more and the thermoplastic resin which melts at the time of occurrence of abnormalities, such as internal short circuit, and adheres closely to the surfaces of the highly thermal conductive particles to join the particles, heat generated at the short-circuit point can be quickly diffused, and heat generation due to the enlargement of the short-circuit area can be suppressed.

The present inventors have found that by using the highly thermal conductive particles and the thermoplastic resin, the thermal conduction of the intermediate layer is improved, and by improving the thermal conduction of the intermediate layer, an increase in the battery temperature at the time of occurrence of abnormalities, such as internal short circuit, can be suppressed. It is considered that, as a result of the combined effect of the highly thermal conductive particles and the thermoplastic resin, the thermal conduction of the intermediate layer is largely improved.

An example of an embodiment will be described in detail below. A cylindrical battery in which a wound-type electrode body 14 is received by a cylindrical battery case will be described as an example below. However, the electrode body is not limited to wound type, but may be a stacked-type electrode body in which a plurality of positive electrodes and a plurality of negative electrodes are alternately stacked with a separator interposed therebetween. Furthermore, the battery case is not limited to a cylindrical shape, but may be a metal case having a prismatic shape (prismatic battery), a coin shape (coin-shaped battery), or the like, or a resin case (laminate battery) formed of a resin film, in the present description, the expression "numerical value (A) to numerical value (3)" means a numerical value (A) or more and a numerical value (3) or less, unless otherwise stated.

Figure 1:
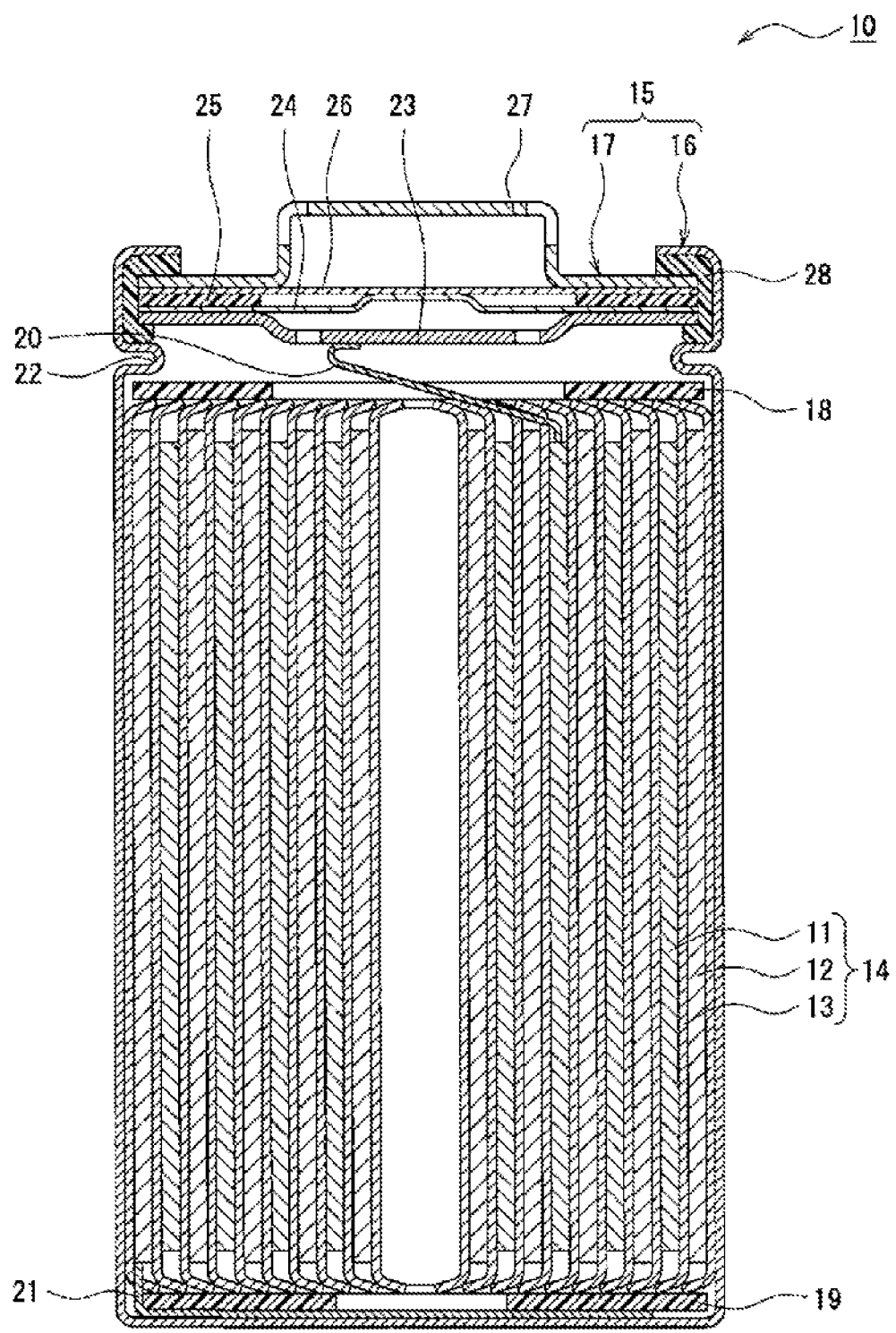
FIG. 1 is a cross-sectional view of a nonaqueous electrolyte secondary battery as an example of an embodiment.

FIG. 1 is a cross-sectional view of a nonaqueous electrolyte secondary battery 10 as an example of an embodiment. As illustrated in FIG. 1, the nonaqueous electrolyte secondary battery 10 includes an electrode body 14, a nonaqueous electrolyte (not shown), and a battery case 15 which accommodates the electrode body 14 and the nonaqueous electrolyte. The electrode body 14 includes a positive electrode 11, a negative electrode 12, and a separator 13, and has a winding structure in which the positive electrode 11 and the negative electrode 12 are wound with the separator 13 interposed therebetween. The battery case 15 includes a closed-bottom, cylindrical outer package can 16 and a sealing body 17 which seals an opening of the outer package can 16.

The nonaqueous electrolyte secondary battery 10 includes insulating plates 18 and 19 which are placed on the upper side and the lower side of the electrode body 14, respectively. In the example shown in FIG. 1, a positive electrode lead 20 attached to the positive electrode 11 extends through a through-hole of the insulating plate 18 to the sealing body 17 side, and a negative electrode lead 21 attached to the negative electrode 12 passes along the outside of the insulating plate 13 and extends to the bottom side of the outer package can 16. The positive electrode lead 20 is connected by welding or the like to a lower surface of a filter 23 which is a bottom plate of the sealing body 17, and a cap 27 which is a top plate of the sealing body 17 electrically connected to the filter 23 serves as a positive electrode terminal. The negative electrode lead 21 is connected by welding or the like to an inner surface of the bottom of the outer package can 16, and the outer package can 16 serves as a negative electrode terminal.

The outer package can 16 is, for example, closed-bottom, cylindrical metal container. A gasket 28 is provided between the outer package can 16 and the sealing body 17 so that airtightness inside the battery can be secured. The outer package can 16 has a protruding portion 22 in which, for example, a part of a side portion protrudes toward the inside and which supports the sealing body 17. The protruding portion 22 is preferably formed in an annular shape along the circumferential direction of the outer package can 16, and the upper surface thereof supports the sealing body 17.

The sealing body 17 has a structure in which the filter 23, a lower valve body 24, an insulating member 25, an upper valve body 26, and the cap 27 are stacked in this order from the electrode body 14 side. The individual members constituting the sealing body 17 have, for example, a circular plate shape or a ring shape, and the members other than the insulating member 25 are electrically connected to one another. The lower valve body 24 and the upper valve body 26 are connected to each other at the central portions thereof, and the insulating member 25 is interposed between the peripheral portions thereof. When the internal pressure of the battery increases due to abnormal heat generation, the lower valve body 24 is deformed so as to push the upper valve body 26 up toward the cap 27 and is broken, and the current path between the lower valve body 24 and the upper valve body 26 is cut off. When the internal pressure further increases, the upper valve body 26 is broken, and a gas is exhausted from an opening of the cap 27.

[Positive Electrode]

Figure 2:
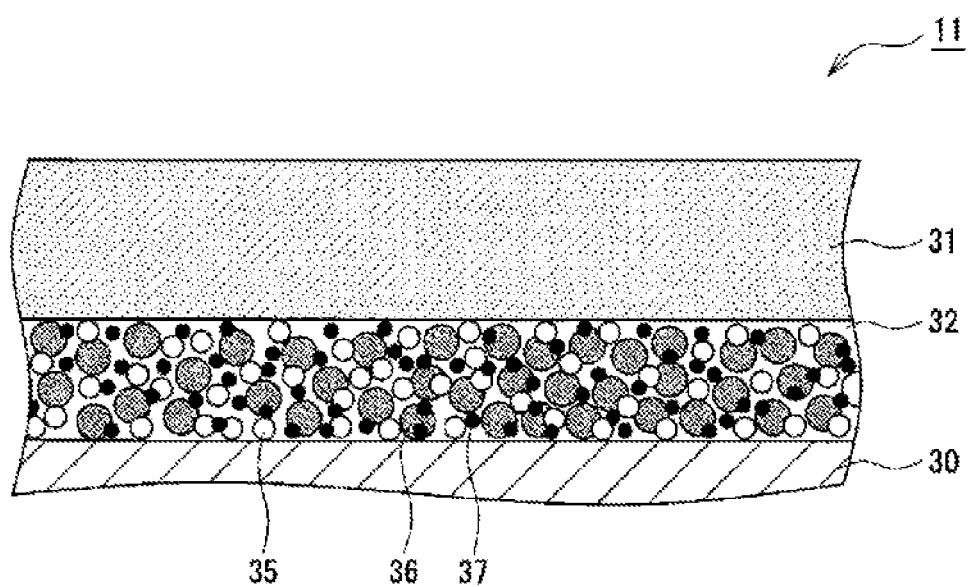
FIG. 2 is a cross-sectional view of a positive electrode for a nonaqueous electrolyte secondary battery as an example of an embodiment.

FIG. 2 is a cross-sectional view showing a part of a positive electrode 11 as an example of an embodiment. As shown in FIG. 2, the positive electrode 11 includes a positive electrode current collector 30, a positive electrode mixture layer 31 which is disposed on at least one surface side of the positive electrode current collector 30, and an intermediate layer 32 which is interposed between the positive electrode current collector 30 and the positive electrode mixture layer 31. As the positive electrode current collector 30, a foil of a metal, such as aluminum, that is stable in the potential range of the positive electrode 11, a film in which the metal is disposed as a surface layer, or the like can be used. For example, the positive electrode current collector 30 is a metal foil of aluminum or an aluminum alloy with a thickness of 10 to 20 µm.

The positive electrode mixture layer 31 contains a positive electrode active material, an conductive material, and a binder, and is preferably formed on each of both surfaces of the positive electrode current collector 30 with an intermediate layer 32 interposed therebetween. The positive electrode 11 can be formed by applying a positive electrode mixture slurry containing a positive electrode active material, an conductive material, a binder, and the like onto the positive electrode current collector 30 provided with intermediate layers 32, and after drying the resulting coating films, performing rolling to form positive electrode mixture layers 31 on both surfaces of the current collector. The thickness of the positive electrode mixture layer 31 is, for example, 30 to 100 µm for one side of the positive electrode current collector 30.

As the positive electrode active material, for example, a lithium metal composite oxide containing a metal element, such as Co, Mn, Ni, or Al, may be used. The metal element constituting the lithium metal composite oxide is, for example, at least one selected from the group consisting of Mg, Al, Ca, Sc, Ti, V, Cr, Mn, Fe, Co, Ni, Cu, Zn, Ga, Ge, Y, Zr, Sn, Sb, W, Pb, and Bi. In particular, the lithium metal composite oxide preferably contains at least one selected from the group consisting of Co, Ni, Mn, and Al. Preferred examples of the lithium metal composite oxide include a lithium metal composite oxide containing Co, Ni, and Mn, and a lithium metal composite oxide containing Co, Ni, and Al.

Examples of the conductive material include carbon materials, such as carbon black, acetylene black, Ketjen black, graphite, carbon nanotubes, carbon nanofibers, and graphene. Examples of the binder include fluorine-containing resins such as polytetrafluoroethylene (PTFE) and polyvinylidene fluoride (PVdF), polyacrylonitrile (PAN), polyimides, acrylic resins, and polyolefins. Furthermore, these resins may be used together with carboxymethyl cellulose (CMC) or a salt thereof, polyethylene oxide (PEO), or the like.

The content of the conductive material in the positive electrode mixture layer 31 is, for example, 0.5 to 15 parts by mass, preferably 1 to 10 parts by mass, relative to 100 parts by mass of the positive electrode active material. When the content of the conductive material is within the range described above, good electrical conductivity of the positive electrode mixture layer 31 can be easily ensured. Furthermore, the content of the binder in the positive electrode mixture layer 31 is, for example, 0.1 to 10 parts by mass, preferably 0.5 to 5 parts by mass, relative to 100 parts by mass of the positive electrode active material. When the content of the binder is within the range described above, good binding properties between active material particles, between active material particles and conductive material particles, and between active material particles and the positive electrode current collector 30 can be easily ensured.

As described above, the positive electrode 11 includes the intermediate layer 32 interposed between the positive electrode current collector 30 and the positive electrode mixture layer 31. Since the positive electrode mixture layer 31 is formed on each of both sides of the positive electrode current collector 30, the intermediate layer 32 is also formed on each of both surfaces of the positive electrode current collector 30. The intermediate layer 32 is a layer that has higher thermal conduction than the positive electrode mixture layer 31 and has functions of quickly diffusing heat generated at the short-circuit point at the time of occurrence of internal short circuit and suppressing an increase in the battery temperature due to the enlargement of the short-circuit area. The intermediate layer 32 contains insulating inorganic particles 35 having a thermal conductivity of less than 50 W/mK, highly thermal conductive particles 36 having a thermal conductivity of 50 W/mK or more, a thermoplastic resin 37, and polyvinylidene fluoride (PVdF). The content of the inorganic particles 35 is 50% by mass or more relative to the mass of the intermediate layer 32.

PVdF contained in the intermediate layer 32 functions as a binder. The content of PVdF is preferably 0.1 to 10% by mass, and more preferably 1 to 5% by mass, relative to the mass of the intermediate layer 32. When the content of PVdF is within the range described above, good binding properties between the individual particles, between the individual particles and the positive electrode current collector 30, and between the individual particles and the positive electrode mixture layer 31 can be easily ensured. Note that the thermoplastic resin 37, together with PVdF, may function as a binder during normal use of the battery.

The inorganic particles 35 are insulating particles composed of an inorganic compound and improve the strength of the intermediate layer 32. The inorganic, particles 35, for example, may be harder than the highly thermal conductive particles 36 and may sink into the positive electrode current collector 30 in the step of rolling the positive electrode 11. When the inorganic particles 35 sink into the positive electrode current collector 30, the peel strength of the intermediate layer 32 is improved. In the case where the inorganic particles 35 are not present, it is difficult to ensure the strength of the intermediate layer 32, and the functions of the intermediate layer 32 cannot be realized.

Examples of the inorganic particles 35 include particles of an inorganic oxide, such as manganese oxide, silicon oxide (silica), titanium oxide (titania), or aluminum oxide (alumina). Above all, at least one selected from the group consisting of titanium oxide and aluminum oxide is preferable, and aluminum oxide is particularly preferable. The average particle size of the inorganic particles 35 is not particularly limited, but is preferably 0.1 to 2 µm. In the present description, the term "average particle size" refers to the volume-average particle size measured by a laser diffraction method, meaning the median diameter (50% particle size) at which the cumulative volume is 50% in the particle size distribution, unless otherwise stated. The average particle size is measured by using a laser diffraction scattering particle size distribution measurement apparatus.

The content of the inorganic particles 35 is at least 50% by mass, preferably 55 to 35% by mass, and more preferably 60 to 80% by mass, relative to the mass of the intermediate layer 32. When the content of the inorganic particles 35 is within the range described above, the strength of the intermediate layer 32 can be easily ensured.

The highly thermal conductive particles 36 are particles having a thermal conductivity of 50 w/mK or more and improve the thermal conduction of the intermediate layer 32. The thermal conductivity of the highly thermal conductive particles 36 is preferably 100 W/mK or more, and more preferably 200 W/mK or more. The thermal conductivity of the highly thermal conductive particles 36 is measured by a laser flash method. By using the highly thermal conductive particles 36, the thermal conduction of the intermediate layer 32 is improved, and it becomes possible to quickly diffuse heat generated at the short-circuit point at the time of occurrence of internal short circuit.

The highly thermal conductive particles 36 may be any one of metal particles and inorganic compound particles (ceramic particles). For example, the highly thermal conductive particles 36 may be at least one selected from the group consisting of metal particles containing Al, metal particles containing Au, metal particles containing W, aluminum nitride particles, boron nitride particles, silicon nitride particles, and silicon carbide particles. Above all, metal particles are preferable, and metal particles containing Al, e.g., aluminum particles and aluminum alloy particles, are particularly preferable. The average particle size of the highly thermal conductive particles 36 is not particularly limited, but preferably is larger than the average particle size of the inorganic particles 35 and is 1 to 5 µm.

The content of the highly thermal conductive particles 36 is, for example, 3 to 40% by mass, preferably 5 to 35% by mass, and more preferably 10 to 30% by mass, relative to the mass of the intermediate layer 32. When the content of the highly thermal conductive particles 36 is within the range described above, heat generated at the short-circuit point at the time of occurrence of internal short circuit can be quickly diffused, and an increase in the battery temperature can be easily suppressed. Preferably, the highly thermal conductive particles 36 are contained in the intermediate layer 32 in a mass 0.1 to 0.5 times the mass of the inorganic particles 35. Furthermore, preferably, the highly thermal conductive particles 35 are contained in the intermediate layer 32 in a mass 0.5 to 5 times the mass of the thermoplastic resin 37.

The thermoplastic resin 37 is caused to melt by the heat generated at the time of internal short circuit, adheres closely to the surfaces of the highly thermal conductive particles 36 to join the particles, and improves the thermal conduction of the intermediate layer 32. The thermoplastic resin 37, for example, joins the highly thermal conductive particles 35 together to form a heat transfer path. Furthermore, heat generation at the time of occurrence of internal short circuit is also suppressed by latent heat when the thermoplastic resin 37 changes from a solid into a liquid. The melting point of the thermoplastic resin 37 is not particularly limited, but is preferably 110 to 200° C., and more preferably 120 to 150° C.

The thermoplastic resin 37 is a resin that is a solid during normal use of the battery and melts at the time of occurrence of abnormalities, such as internal short circuit. For example, the thermoplastic resin 37 may be at least one selected from the group consisting of a polyolefin, a polycarbonate, a polyamide-imide, a polystyrene, a polyurethane, and an acrylic resin. Examples of the polyolefin include polyethylene, a copolymer of ethylene and α-olefin, polypropylene, and the like. Among these, a polyolefin is preferable, and polyethylene or a copolymer of ethylene and α-olefin is particularly preferable.

The content of the thermoplastic resin 37 is, for example, 1 to 30% by mass, preferably 3 to 25% by mass, and more preferably 5 to 20% by mass, relative to the mass of the intermediate layer 32. When the content of the thermoplastic resin 37 is within the range described above, while ensuring the strength of the intermediate layer 32 and the appropriate filling amount of the highly thermal conductive particles 36, the highly thermal conductive particles 36 can be efficiently joined together at the time of occurrence of internal short circuit, and an increase in the battery temperature can be easily suppressed. Preferably, thermoplastic resin 37 is contained in the intermediate layer 32 in a mass 0.2 to 2 times the mass of the highly thermal conductive particles 36.

The thickness of the intermediate layer 32 is not particularly limited, but is preferably smaller than the thickness of each of the positive electrode current, collector 30 and the positive electrode mixture layer 31. For example, the intermediate layer 32 has a thickness of 1 to 10 µm, and preferably 1 to 3 µm. The intermediate layer 32 is formed, for example, at a surface density of 0.1 g/m$^2$ to 20 g/m$^2$ on the surface of the positive electrode current collector 30. The intermediate layer 32 can be formed by applying a slurry containing the inorganic particles 35, the highly thermal conductive particles 36, the thermoplastic resin 37, and PVdF onto the positive electrode current collector 30 and drying the resulting coating film.

[Negative Electrode]

The negative electrode 12 includes a negative electrode current collector and a negative electrode mixture layer formed on the current collector. As the negative electrode current collector, a foil of a metal, such as copper, that is stable in the potential range of the negative electrode 12, a film in which the metal is disposed as a surface layer, or the like can be used. The negative electrode mixture layer includes a negative electrode active material and a binder, and is preferably formed on each of both surfaces of the negative electrode current collector. The negative electrode 12 can be fabricated by forming a negative electrode mixture layer on each of both surfaces of a negative electrode current collector by applying a negative electrode mixture slurry containing a negative electrode active material, a binder, and the like onto the negative electrode current collector and drying the resulting coating films, followed by rolling.

The negative electrode active material is not particularly limited as long as it can reversibly occlude and release lithium ions. For example, a carbon material such as natural graphite or artificial graphite, a metal such as Si or Sn which forms an alloy with Li, or a metal compound containing Si, Sn, or the like may be used. Examples of the metal compound include a silicon compound represented by $SiO_x$ ($0.5 \leq x \leq 1.6$), a silicon compound represented by $Li_{2y}SiO_{(2+y)}$ ($0<y<2$), and the like. Furthermore, the negative electrode mixture layer may contain, as a negative electrode active material, a lithium titanium composite oxide, when a lithium titanium composite oxide is used, a conductive material, such as carbon black, is preferably added to the negative electrode mixture layer.

As the binder contained in the negative electrode mixture layer, a fluorine-containing resin such as PTFE or PVdF, pan, a polyimide, an acrylic resin, a polyolefin, styrene-butadiene rubber (SBR), or the like can be used. Furthermore, the negative electrode mixture layer may contain CMC or a salt thereof, polyacrylic acid (PAA) or a salt thereof, polyvinyl alcohol (PVA), or the like. The content of the binder is, for example, 0.1 to 10 parts by mass, and preferably 0.5 to 5 parts by mass, relative to 100 parts by mass of the negative electrode active material.

[Separator]

As the separator 13, a porous sheet having ion permeability and an insulating property is used. Specific examples of the porous sheet include a microporous thin film, woven fabric, and non-woven fabric. As the material for the separator, a polyolefin such as polyethylene or polypropylene, cellulose, or the like is preferably used. The separator 13 may have either a single-layer structure or a multilayer structure. Furthermore, a resin layer having high heat resistance, such as an aramid resin, may be formed on the surface of the separator 13.

A filler layer containing an inorganic filler may be formed at at least one of an interface between the separator 13 and the positive electrode 11 and an interface between the separator 13 and the negative electrode 12. Examples of the inorganic filler include oxides containing a metal, such as Ti, Al, Si, or Mg, phosphate compounds, and the like. The filler layer can be formed by applying a slurry containing the filler onto the surface of the positive electrode 11, the negative electrode 12, or the separator 13.

[Nonaqueous Electrolyte]

The nonaqueous electrolyte includes a nonaqueous solvent and an electrolyte salt dissolved in the nonaqueous solvent. As the nonaqueous solvent, for example, an ester, an ether, a nitrile such as acetonitrile, an amide such as dimethylformamide, or a mixed solvent containing two or more of these solvents may be used. The nonaqueous solvent may contain a halogen substitution product in which at least part of hydrogen atoms of the solvent described above is substituted with halogen atoms, such as fluorine. Examples of the halogen substitution product include fluorinated cyclic carbonate esters, such as fluoroethylene carbonate (FEC); fluorinated chain carbonate esters; and fluorinated chain carboxylate esters, such as fluoromethyl propionate (FMP).

Examples of the ester include cyclic carbonate esters, such as ethylene carbonate (EC), propylene carbonate (PC), and butylene carbonate; chain carbonate esters, such as dimethyl carbonate (DMC), ethyl methyl carbonate (EMC), diethyl carbonate (DEC), methyl propyl carbonate, ethyl propyl carbonate, and methyl isopropyl carbonate; cyclic carboxylate esters, such as γ-butyrolactone (GBL) and γ-valerolactone (GVL); and chain carboxylate esters, such as methyl acetate, ethyl acetate, propyl acetate, methyl propionate (MP), and ethyl propionate.

Examples of cyclic ethers include 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, crown ether, and the like. Examples of chain ethers include 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, tetraethylene glycol dimethyl ether, and the like.

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, lithium chloroborane, lower aliphatic lithium carboxylates, borates such as $Li_2B_4O_7$ and $Li(B(C_2O_4)F_2)$, and imide salts such as $LiN(SO_2CF_3)_2$ and $LiN(C_lF_{2l+1}SO_2)(C_mF_{2m+1}SO_2)$ (l and m are integers of 0 or more). These lithium salts may be used alone or in a mixture of two or more. Among these, from the viewpoint of ionic conductivity, electrochemical stability, and the like, $LiPF_6$ is preferably used. The concentration of the lithium salt is, for example, 0.8 mol to 1.3 mol per liter of the nonaqueous solvent.

EXAMPLES

The present disclosure will be further described in detail below with reference to examples. However, it is to be understood that the present disclosure is not limited the examples.

Example 1

[Production of Positive Electrode]

80 Parts by mass of aluminum oxide ($Al_2O_3$) particles (thermal conductivity 36 W/mK), 10 parts by mass of aluminum particles (thermal conductivity 236 W/mK), 7 parts by mass of polyethylene, and 3 parts by mass of PVdF were mixed, and an appropriate amount of N-methyl-2-pyrrolidone (NMP) was added thereto to prepare a slurry. Subsequently, the slurry was applied onto each of both surfaces of a positive electrode current collector formed of an aluminum foil with a thickness of 15 μm, followed by drying, thereby forming an intermediate layer with a thickness of 2 μm.

97 Parts by mass of a lithium metal composite oxide represented by $LiNi_{0.5}Co_{0.2}Mn_{0.3}O_2$ serving as a positive electrode active material, 2 parts by mass of acetylene black (AB), and 1 part by mass of PVdF were mixed, and an appropriate amount of NMP was added thereto to prepare a positive electrode mixture slurry. Subsequently, the positive electrode mixture slurry was applied onto both surfaces of the positive electrode current collector provided with the intermediate layers, followed by drying. The resulting product was cut to a predetermined electrode size and rolled with a roller to produce a positive electrode in which the intermediate layer and the positive electrode mixture layer were disposed in this order on each of both surfaces of the positive electrode current collector.

[Production of Negative Electrode]

98.7 Parts by mass of graphite powder, 0.7 parts by mass of sodium carboxymethyl cellulose (CMC-Na), and 0.6 parts by mass of a styrene-butadiene rubber (SBR) dispersion were mixed, and an appropriate amount of water was added thereto to prepare a negative electrode mixture slurry. Subsequently, the negative electrode mixture slurry was applied onto both surfaces of a negative electrode current collector formed of a copper foil, followed by drying. The resulting product was cut to a predetermined electrode size and rolled with a roller to produce a negative electrode in which the negative electrode mixture layer was disposed on each of both surfaces of the negative electrode current collector.

[Preparation of Nonaqueous Electrolyte]

Ethylene carbonate (EC), methyl ethyl carbonate (EMC), and dimethyl carbonate (DMC) were mixed at a volume ratio of 3:3:4. In the mixed solvent, $LiPF_6$ was dissolved at a concentration of 1.2 mol/L to prepare a nonaqueous electrolyte.

[Fabrication of Battery]

An aluminum lead was attached to the positive electrode, and a nickel lead was attached to the negative electrode. The positive electrode and the negative electrode were alternately stacked with a polyethylene separator interposed therebetween to produce a stacked-type electrode body. The electrode body was received in a battery outer case formed of an aluminum laminate sheet, the nonaqueous electrolyte was injected thereinto, and then the outer case was sealed, thereby fabricating a nonaqueous electrolyte secondary battery.

[Short-Circuit Test]

The resulting battery was charged with a constant current of 0.3 C to an end-of-charge voltage of 4.3 V, and then charged with a constant voltage of 4.3 V until the current value reached 0.05 C. in an environment of 25° C., a wire nail was stuck into the central portion of the side face of the charged battery, the sticking of the wire nail was stopped when the wire nail fully penetrated the battery, and the Joule heat value was measured.

Examples 2 and 3 and Comparative Examples 1 to 3

Batteries were fabricated as in Example 1 except that, in the formation of the intermediate layer, the mixing ratio of the constituent materials was changed to those shown in Table 1, and the short-circuit test was performed.

TABLE 1

| | Mixing ratio in intermediate layer | | | | Short-circuit test Heat value (J) |
|---|---|---|---|---|---|
| | Alumina | Aluminum | Polyethylene | PVdF | |
| Example 1 | 80 | 10 | 7 | 3 | 0.01 |
| Example 2 | 60 | 30 | 7 | 3 | 0.05 |
| Example 3 | 67 | 10 | 20 | 3 | 0.10 |
| Comparative Example 1 | 0 | 62 | 35 | 3 | 0.50 |
| Comparative Example 2 | 90 | 0 | 7 | 3 | 0.25 |
| Comparative Example 3 | 87 | 10 | 0 | 3 | 0.20 |

As shown in Table 1, in all of the batteries of Examples, the heat, value in the short-circuit test was low compared with the batteries of Comparative Examples. That is, in the batteries of Examples, heat generation at the time of occurrence of internal short circuit is largely suppressed compared with the batteries of Comparative Examples. In the case where alumina is not present in the intermediate layer (Comparative Example 1), in the case where aluminum is not present (Comparative Example 2), and in the case where polyethylene is not present (Comparative Example 3), the effect of suppressing the heat value was not observed. In the case where alumina is not present in the intermediate layer, it is considered that the intermediate layer peeled off at the time of short circuit, resulting in an increase in the heat value.

REFERENCE SIGNS LIST 10 nonaqueous electrolyte secondary battery
11 positive electrode
12 negative electrode
13 separator
14 electrode body
15 battery case
16 outer package can
17 sealing body
18, 19 insulating plate
20 positive electrode lead
21 negative electrode lead
22 protruding portion
23 filter
24 lower valve body
25 insulating member
26 upper valve body
27 cap
26 gasket
30 positive electrode current collector
31 positive electrode mixture layer
32 intermediate layer
35 inorganic particle
36 highly thermal conductive particle
37 thermoplastic resin

The invention claimed is:

1. A positive electrode for a nonaqueous electrolyte secondary battery comprising:
   a positive electrode current collector;
   a positive electrode mixture layer which is disposed on at least one surface side of the positive electrode current collector; and
   an intermediate layer which is interposed between the positive electrode current collector and the positive electrode mixture layer,
   wherein the intermediate layer contains insulating inorganic particles having a thermal conductivity of less than 50 W/mK, highly thermal conductive particles having a thermal conductivity of 50 W/mK or more, a thermoplastic resin, and polyvinylidene fluoride;
   the content of the inorganic particles is in a range of from 50% to 67% by mass relative to the mass of the intermediate layer;
   the content of the highly thermal conductive particles is 10 to 30% by mass relative to the mass of the intermediate layer;
   the content of the thermoplastic resin is 5 to 20% by mass relative to the mass of the intermediate layer;
   the highly thermal conductive particles are metal particles containing Al; and
   the inorganic particles are aluminum oxide.

2. The positive electrode for a nonaqueous electrolyte secondary battery according to claim 1, wherein the thermoplastic resin is at least one selected from the group consisting of a polyolefin, a polycarbonate, a polyamide-imide, a polystyrene, a polyurethane, and an acrylic resin.

3. The positive electrode for a nonaqueous electrolyte secondary battery according to claim 1, wherein the highly thermal conductive particles are contained in a mass 0.5 to 5 times the mass of the thermoplastic resin.

4. A nonaqueous electrolyte secondary battery comprising:
   the positive electrode according to claim 1;
   a negative electrode; and
   a nonaqueous electrolyte.

* * * * *